United States Patent
Vassilieva et al.

(10) Patent No.: US 10,243,688 B2
(45) Date of Patent: Mar. 26, 2019

(54) REACH EXTENSION OF MULTI-CARRIER CHANNELS USING UNEQUAL SUBCARRIER SPACING

(71) Applicant: Fujitsu Limited, Kawasaki-shi, Kanagawa (JP)

(72) Inventors: Olga Vassilieva, Plano, TX (US); Inwoong Kim, Allen, TX (US); Tadashi Ikeuchi, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/620,407

(22) Filed: Jun. 12, 2017

(65) Prior Publication Data
US 2018/0359047 A1  Dec. 13, 2018

(51) Int. Cl.
| | | |
|---|---|---|
| H04B 10/08 | (2006.01) | |
| H04B 17/00 | (2015.01) | |
| H04J 14/00 | (2006.01) | |
| H04J 4/00 | (2006.01) | |
| H04J 14/02 | (2006.01) | |
| H04B 10/50 | (2013.01) | |
| H04L 27/00 | (2006.01) | |
| H04B 10/079 | (2013.01) | |
| H04Q 11/00 | (2006.01) | |

(52) U.S. Cl.
CPC .... *H04J 14/0298* (2013.01); *H04B 10/07953* (2013.01); *H04B 10/505* (2013.01); *H04B 10/5057* (2013.01); *H04J 14/0224* (2013.01); *H04L 27/0012* (2013.01); *H04Q 11/0066* (2013.01); *H04Q 2011/0083* (2013.01)

(58) Field of Classification Search
USPC .......................................... 398/76
See application file for complete search history.

(56) References Cited

U.S. PATENT DOCUMENTS

| | | | | |
|---|---|---|---|---|
| 6,118,561 A | * | 9/2000 | Maki ............. | H04B 10/506 398/1 |
| 2005/0213986 A1 | * | 9/2005 | Yoshimoto ....... | H04B 10/25133 398/147 |
| 2010/0158531 A1 | * | 6/2010 | Chung .............. | H04B 10/2557 398/79 |
| 2010/0290786 A1 | * | 11/2010 | Abbott ............. | H04J 14/0204 14/204 |
| 2012/0269506 A1 | * | 10/2012 | Vassilieva ......... | H04J 14/0221 14/221 |
| 2014/0314415 A1 | * | 10/2014 | Vassilieva ......... | H04J 14/0227 14/227 |

(Continued)

OTHER PUBLICATIONS

Qiu, Meng, et al. "Subcarrier multiplexing using DACs for fiber nonlinearity mitigation in coherent optical communication systems." Proc. OFC. 2014; 3 pages.

(Continued)

*Primary Examiner* — David C Payne
*Assistant Examiner* — Pranesh K Barua
(74) *Attorney, Agent, or Firm* — Baker Botts L.L.P.

(57) ABSTRACT

Methods and systems for reach extension of multi-carrier channels using unequal subcarrier spacing may decrease FWM by grouping the subcarriers into groups of 2 subcarriers, and apply a secondary, unequal spacing between the groups. In this manner, nonlinear interactions may be reduced and the transmission reach of a multi-carrier channel may be extended.

14 Claims, 7 Drawing Sheets

(56) References Cited

U.S. PATENT DOCUMENTS

2015/0086204 A1* 3/2015 Kaneda ............... H04J 14/0298
    14/298
2016/0050021 A1* 2/2016 Hua ................. H04B 10/07955
    398/38
2016/0315712 A1* 10/2016 Vassilieva ............ H04B 10/564

OTHER PUBLICATIONS

Poggiolini, Pierluigi, et al. "Analytical results on system maximum reach increase through symbol rate optimization." Optical Fiber Communication Conference. Optical Society of America, 2015; 3 pages. 2015.

Nakashima, Hisao, et al. "Experimental investigation on nonlinear tolerance of subcarrier multiplexed signals with spectrum optimization." Optical Communication (ECOC), 2015 European Conference on. IEEE, 2015; 3 pages.

Poggiolini, Pierluigi, et al. "On the ultimate potential of symbol-rate optimization for increasing system maximum reach." Optical Communication (ECOC), 2015 European Conference on. IEEE, 2015; 3 pages.

* cited by examiner

REACH EXTENSION OF MULTI-CARRIER CHANNELS USING UNEQUAL SUBCARRIER SPACING

BACKGROUND

Field of the Disclosure

The present disclosure relates generally to optical communication networks and, more particularly, to reach extension of multi-carrier channels using unequal subcarrier spacing.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency. The transmission reach of a superchannel may be limited by various factors.

Another technique for transmission of optical signals is the use of a multi-carrier channel (also referred to as subcarrier multiplexing (SCM) or Nyquist frequency division multiplexing (Nyquist-FDM)). A multi-carrier channel is generated at a transmitter for an optical channel but with division of the optical channel into a given number of subcarriers. As with superchannels, the transmission reach of a multi-carrier channel may be limited by various factors, such as certain nonlinear effects that undesirably increase noise.

SUMMARY

In one aspect, an optical transmitter comprising a digital signal processor (DSP) and a memory media accessible to the DSP is disclosed. In the optical transmitter, the memory media stores instructions executable by the DSP for receiving data for optical transmission as a multi-carrier channel having a plurality of subcarriers, and mapping the data onto subcarriers. Responsive to receiving a command to apply unequal spectral spacing between at least some of the subcarriers, in the optical transmitter, the instructions may be executable for applying the unequal spectral spacing to the subcarriers, and generating at least one output signal usable to modulate a laser to carry the data as the multi-carrier channel having unequal spectral spacing between at least some of the subcarriers.

In any of the disclosed embodiments of the optical transmitter, the instructions for applying the unequal spectral spacing may further include instructions for applying a second spectral spacing between pairs of subcarriers that are tightly packed to each other at a first spectral spacing corresponding to a bandwidth of the subcarriers, where the second spectral spacing is greater than the first spectral spacing.

In any of the disclosed embodiments of the optical transmitter, the command may be received from a network management system.

In any of the disclosed embodiments of the optical transmitter, the command may be received based on a bit error rate (BER) exceeding a predetermined threshold for the multi-carrier channel received at an optical receiver.

In any of the disclosed embodiments of the optical transmitter, the instructions for receiving the data for optical transmission may further include instructions for receiving a modulation format for the multi-carrier channel, while the command may be based on the modulation format.

In another aspect, an optical receiver comprising a digital signal processor (DSP) and a memory media accessible to the DSP is disclosed. In the optical receiver, the memory media stores instructions executable by the DSP for receiving demodulated data optically transmitted as a multi-carrier channel having a plurality of subcarriers. Responsive to receiving a command indicating unequal spectral spacing between at least some of the subcarriers, in the optical receiver, the instructions may be executable for spectrally resolving the subcarriers based on the unequal spectral spacing, and generating at least one output signal usable to generate the data.

In any of the disclosed embodiments of the optical receiver, the instructions for spectrally resolving the subcarriers may further include instructions for using a second spectral spacing to spectrally resolve pairs of subcarriers that are tightly packed to each other at a first spectral spacing corresponding to a bandwidth of the subcarriers, where the second spectral spacing is greater than the first spectral spacing.

In any of the disclosed embodiments of the optical receiver, the command may be received from a network management system.

In any of the disclosed embodiments of the optical receiver, the command may be received based on a bit error rate (BER) exceeding a predetermined threshold for the multi-carrier channel, where the BER is determined at the optical receiver.

In any of the disclosed embodiments of the optical receiver, the demodulated data may be received from an optical hybrid receiver included in the optical receiver.

In a further aspect, a network management system including a processor having access to memory media storing instructions executable by the processor is disclosed. In the network management system, the instructions may be executable for receiving optical path information for an optical path in an optical network, and receiving channel information specifying a multi-carrier channel having a plurality of subcarriers for transmission over the optical path. In the network management system, the instructions may be further executable for sending a first command to an optical transmitter transmitting the multi-carrier channel to transmit using unequal spectral spacing for at least some of the subcarriers in the multi-carrier channel, sending a second command to an optical receiver receiving the multi-carrier channel to receive according to the unequal spectral spacing, and receiving a bit error rate (BER) from the optical receiver for the multi-carrier channel.

In any of the disclosed embodiments of the network management system, the channel information may include a number of subcarriers in the multi-carrier channel, and a modulation format for the subcarriers.

In any of the disclosed embodiments of the network management system, the first command and the second command are sent based on the BER exceeding a specified value.

In any of the disclosed embodiments of the network management system, using the unequal spectrally spacing may further include using a second spectral spacing between pairs of subcarriers that are tightly packed to each other at a first spectral spacing corresponding to a bandwidth of the subcarriers, where the second spectral spacing is greater than the first spectral spacing.

In any of the disclosed embodiments of the network management system, the first spectral spacing may be given by $\Delta f_{sc}$, the second spectral spacing may be given by $\Delta f_2$, and a relationship between $\Delta f_{sc}$ and $\Delta f_2$ may be given by $\Delta f_{sc}/2 \leq (\Delta f_2 - \Delta f_{sc}) < \Delta f_{sc}$.

In any of the disclosed embodiments of the network management system, a guardband (GB) between spectrally successive multi-carrier channel may be given by $\Delta f_{sc}*M < GB \leq \Delta f_2*L$, where M and L are integers greater than 1.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
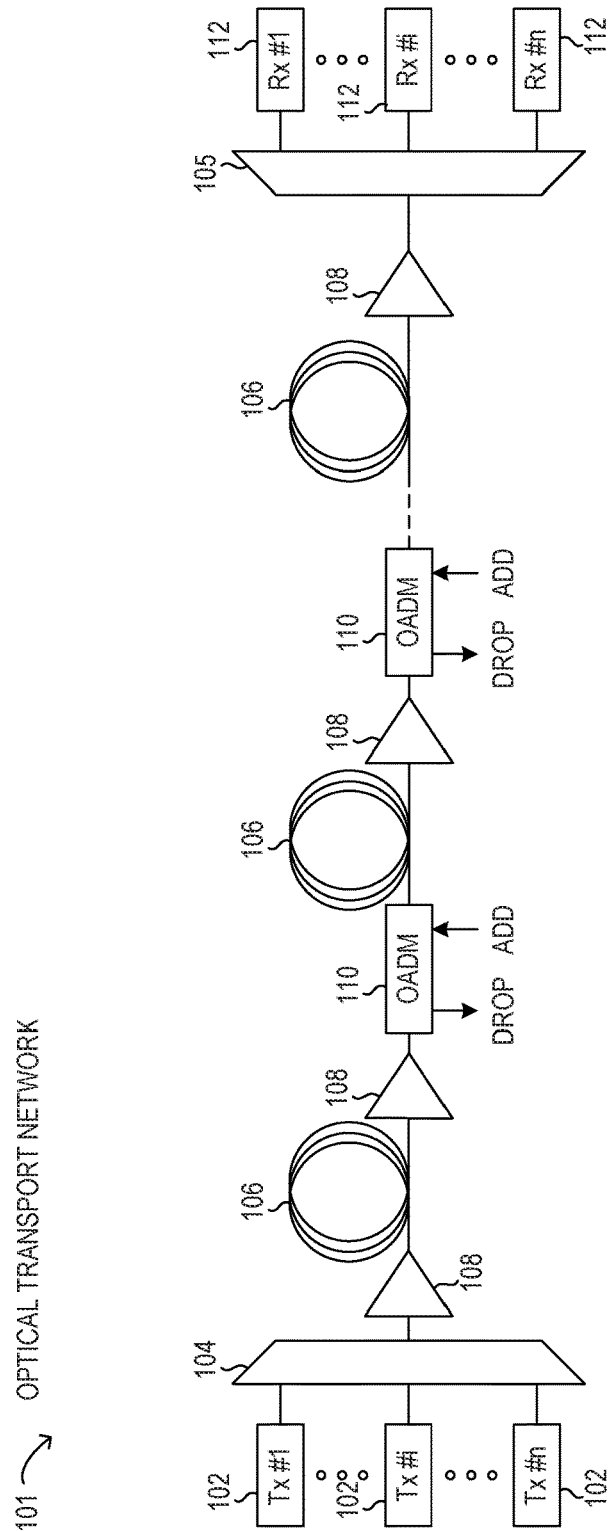
FIG. 1 is a block diagram of selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

As the demand for transmission capacity across optical networks increases, various transmission techniques have been employed to increase the transmission capacity. For example, advanced modulation formats have been introduced that increase the capacity per wavelength channel transmitted. For example, 16-QAM is a modulation format that can carry about 2 times as much information as using QPSK over the same wavelength channel. However, modulation formats that provide greater information density generally result in decreased transmission reach, which results in economic constraints on transmission capacity in the form of a trade-off between transmission reach and transmission capacity. In another example, the advent of multi-carrier channel technology has decreased susceptibility to fiber nonlinearity, which is a limiting factor for optical network transmission, due to the lowered baud rate (symbol rate) of each subcarrier in the multi-carrier channel.

As noted, a factor that can affect fiber nonlinearity is the baud rate. An optimum baud rate has been proposed that can potentially extend the transmission reach by 20%. For example, consider a 32 GBaud DP-QPSK modulated optical signal that is transmitted using a 35 GHz bandwidth optical channel. For this transmission, the 35 GHz bandwidth for the optical channel may be allocated to 1 subcarrier at 32 GBaud (single carrier), 2 subcarriers at 16 GBaud (multi-carrier), 4 subcarriers at 8 GBaud (multi-carrier), 8 subcarriers at 4 GBaud (multi-carrier), or 16 subcarriers at 2 GBaud (multi-carrier), as examples of different baud rates. However, it has been determined that the optimal baud rate in a multi-carrier channel depends on the interplay between single subcarrier nonlinearity, often expressed as self-phase modulation (SPM) and inter-subcarrier nonlinearity, which may originate from cross-phase modulation (XPM) and four-wave mixing (FWM). It has been observed that FWM increases with the number of subcarriers in a multi-carrier channel and is a limiting factor for transmission reach.

As will be disclosed in further detail, reach extension of multi-carrier channels may be accomplished using unequal subcarrier spacing. The methods and systems disclosed herein for reach extension of multi-carrier channels using unequal subcarrier spacing may reduce FWM in a multi-carrier channel and, thus, extend the transmission reach by reducing fiber nonlinearity. The methods and systems disclosed herein for reach extension of multi-carrier channels using unequal subcarrier spacing may enable flexibly adjustment of subcarrier spectral spacing in order to meet traffic demands, including transmission reach and spectral efficiency. The methods and systems disclosed herein for reach extension of multi-carrier channels using unequal subcarrier spacing may reduce FWM by grouping the subcarriers in a multi-carrier channel into groups of 2 subcarriers that are less susceptible to FWM. The methods and systems disclosed herein for reach extension of multi-carrier channels using unequal subcarrier spacing may reduce FWM while enabling granular control of spectral efficiency and transmission reach. The methods and systems disclosed herein for reach extension of multi-carrier channels using unequal subcarrier spacing may be implemented using a universal programmable transceiver, such as a transmitter or a receiver for single carrier and multi-carrier subcarriers. The methods and systems disclosed herein for reach extension of multi-carrier channels using unequal subcarrier spacing may also reduce FWM depending on a selected modulation format.

Referring now to the drawings, FIG. 1 illustrates an example embodiment of optical transport network (OTN) 101, which may represent an optical communication system. Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

Optical transport network 101 includes one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm spacing and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Advancements in DWDM enable combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. In a superchannel, a plurality of subcarriers (or subchannels or channels) are densely packed in a fixed bandwidth band and may be transmitted at very high data rates. Furthermore, the superchannel may be well suited for transmission over very long distances, such as hundreds of kilometers, for example. A typical superchannel may comprise a set of subcarriers that are frequency multiplexed to form a single channel that are transmitted through an optical transport network as one entity. The subcarriers within the superchannel may be tightly packed to achieve high spectral efficiency.

In particular embodiments, Nyquist frequency-division multiplexing (N-FDM) may be used in a channel. In N-FDM, optical pulses having a nearly rectangular spectrum are packed together in the frequency domain with a bandwidth approaching the baud rate (see also FIGS. 2A and 2B).

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101 (see also FIG. 4A). In some embodiments, optical transmitter 102 may be used to determine the baud rate for the data to be transmitted during the optical modulation. An example of transmitter 102 for applying different baud rates is an adaptive rate transponder. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain (see also FIG. 5A). Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, π/2, π, and 3π/2). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

As will be described in further detail herein, methods and systems are disclosed for reach extension of multi-carrier channels using unequal subcarrier spacing that may reduce FWM and thereby enable reach extension. The methods and systems disclosed herein for reach extension of multi-carrier channels using unequal subcarrier spacing may apply certain general rules or guidelines for multi-carrier channel and subcarrier spacing. For example, as the multi-carrier channel bandwidth is increased due to unequal subcarrier spacing, certain values for the guardband between multi-carrier channels may be decreased.

Figure 2A:
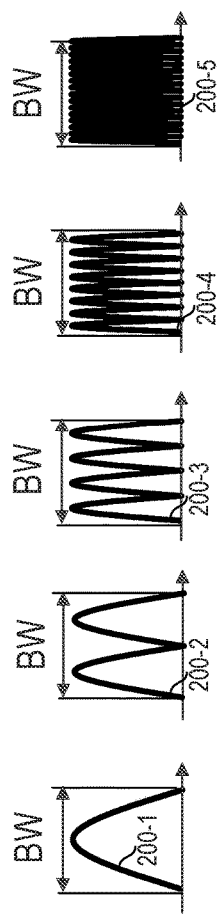
FIG. 2A shows spectra of single carrier and multi-carrier channels.

Referring to FIG. 2A, selected embodiments of an optical channel are shown as power spectra 200, which depicts five (5) spectra. Spectra 200 are shown in a schematic representation that is not drawn to scale. Specifically, spectrum 200-1 shows a single carrier channel having a bandwidth BW. When BW is 35 GHz, for example, the single channel in spectrum 200-1 may have a 32 Gbaud symbol rate. Spectrum 200-2 shows a multi-carrier channel having 2 subcarriers. When BW=35 GHz, each of the subcarriers in spectrum 200-2 may have a 16 Gbaud symbol rate. Spectrum 200-3 shows a multi-carrier channel having 4 subcarriers. When BW=35 GHz, each of the subcarriers in spectrum 200-3 may have an 8 Gbaud symbol rate. Spectrum 200-4 shows a multi-carrier channel having 8 subcarriers. When BW=35 GHz, each of the subcarriers in spectrum 200-4 may have a 4 Gbaud symbol rate. Spectrum 200-5 shows a multi-carrier channel having 16 subcarriers. When BW=35 GHz, each of the subcarriers in spectrum 200-5 may have a 2 Gbaud symbol rate. The multi-carrier channels may be generated using a single transmitter with a DSP that can split the optical channel into the desired number of subcarriers. It is noted that the channel bandwidth BW and the optical power remains the same for the optical channel, whether transmitted as a single carrier channel or as a multi-carrier channel.

The nonlinear interactions between subcarriers of a multi-carrier channel may include phenomena such as cross-phase modulation (XPM), self-phase modulation (SPM), and four-wave mixing, among others. Cross-phase modulation may occur when phase information, amplitude information, or both from one subcarrier is modulated to an adjacent subcarrier in the multi-carrier channel. Self-phase modulation may arise when a variation in the refractive index (or a dependency of the refractive index on intensity) results in a phase shift within each subcarrier. In four-wave mixing (FWM), three wavelengths may interact to create a fourth wavelength that may coincide with a wavelength of a subcarrier, and may lead to undesirable variations in peak power or other types of signal distortion on the affected subcarrier. Furthermore, nonlinear cross-talk may comprise inter-subcarrier components. Since nonlinear interactions occur during fiber transmission and may not depend on a degree of overlap of the subcarrier frequency bands, Nyquist pulse shaping may be ineffective in resolving certain problems with nonlinear cross-talk in a multi-carrier channel.

Furthermore, in particular embodiments, more than one multi-carrier channel may be transmitted simultaneously. For example, the any of the multi-carrier channels shown in FIG. 2A may be transmitted along with another multi-carrier channel (see FIG. 2B). In this case, a guardband (GB) may be applied between the first multi-carrier channel and the second multi-carrier channel to mitigate nonlinear interactions in the fiber.

Figure 2B:
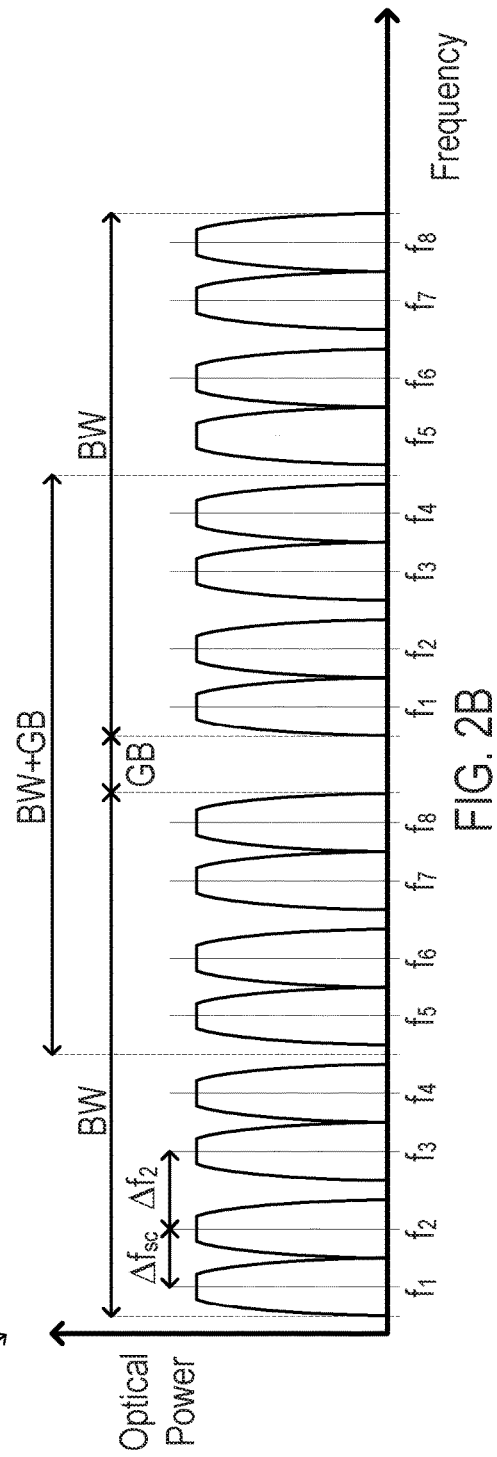
FIG. 2B shows selected elements of an embodiment of a multi-carrier channel power spectrum with unequal subcarrier spacing.

FIG. 2B depicts a multi-carrier channel power spectrum 201 with unequal subcarrier spacing. In power spectrum 201, two multi-carrier channels having a BW greater than 35 GHz are shown with 8 subcarriers ($f_1$ to $f_8$) each and with unequal spacing $\Delta f_2$ between some of the subcarriers. If the unequal spacing $\Delta f_2$ was not used (not shown), the multi-carrier channels would have a BW=35 GHz, or $\Delta f_{sc}$=4.375 GHz per subcarrier. If the baud rate was decreased without using the unequal spacing $\Delta f_2$ by doubling the number of subcarriers to 16, the total BW of the multi-carrier channel would still be 35 GHZ, but with $\Delta f_{sc}$=2.2 GHz per subcarrier. It is noted that the multi-carrier channels may also be transmitted together with single carrier channels.

As shown, the unequal spacing $\Delta f_2$ may be applied using certain rules or guidelines. First, based on the channel symbol rate and pulse shaping used, the multi-carrier channel bandwidth BW is determined along with the number of subcarriers N. Then, the subcarriers are divided into groups of 2 or adjacent pairs. The groups of 2 are chosen in order to prevent or mitigate FWM that occurs when the photons of three tightly packed subcarriers interact. Then, a value for $\Delta f_{sc}$ is determined by $\Delta f_{sc}=BW/N$. Furthermore, the value of $\Delta f_2$ between the groups of 2 subcarriers is determined by $\Delta f_{sc}/2 \leq (\Delta f_2 - \Delta f_{sc}) < \Delta f_{sc}$. Then, the guardband GB between multi-carrier channels may be determined by $\Delta f_{sc}*M < GB \leq \Delta f_2*L$, where M and L are integers greater than 1. Thus, in power spectrum 201, for 8 subcarriers, when $\Delta f_2$ is selected between about 2-4 GHz, the multi-carrier channel bandwidth BW will be between 41-47 GHz. It is noted that when 16 subcarriers are used (not shown), when $\Delta f_2$ is selected between about 1-2 GHz, the multi-carrier channel bandwidth BW will also be between 41-47 GHz.

Figure 3:
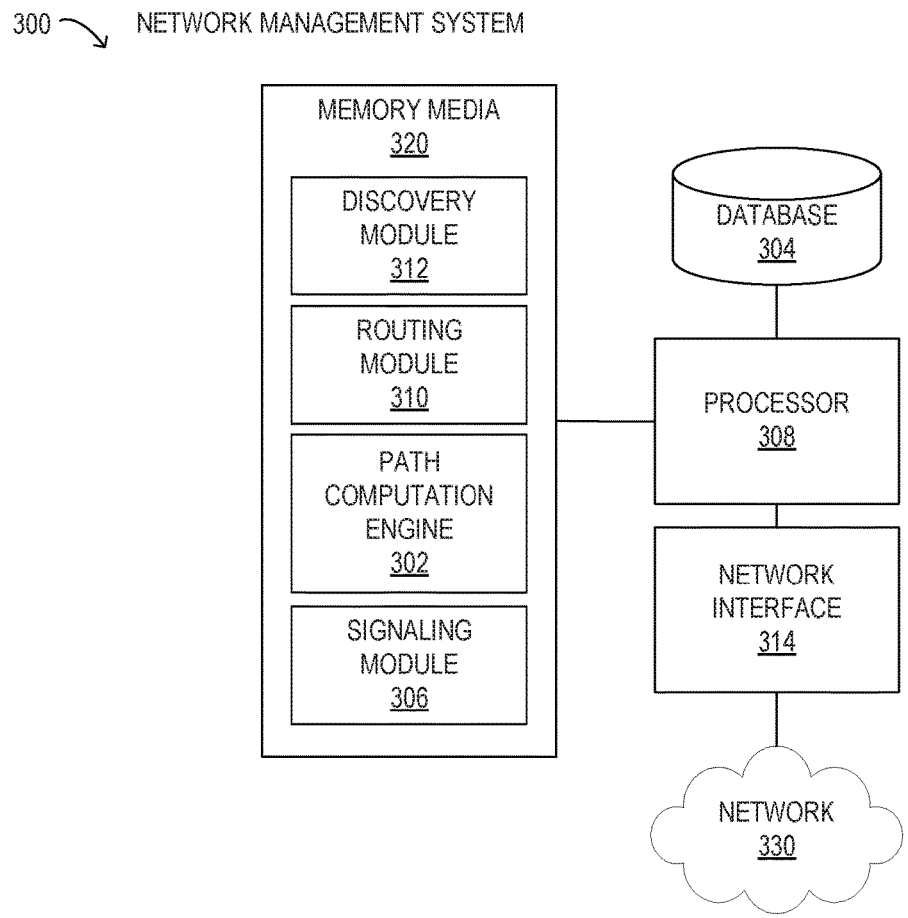
FIG. 3 is a block diagram of selected elements of an embodiment of a network management system for using unequal subcarrier spacing.

Referring now to FIG. 3, a block diagram of selected elements of an embodiment of network management system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, network management system 300 includes processor 308 and memory media 320, which may store executable instructions (i.e., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, and routing module 310.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of optical transport network 101. Network 330 may also include certain portions of a network using galvanic or electronic media. In certain embodiments, network 330 may include at least certain portions of a public network, such as the Internet. Network 330 may be implemented using hardware, software, or various combinations thereof.

In certain embodiments, network management system 300 may be configured to interface with a person (a user) and receive data about the optical signal transmission path. For example, network management system 300 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, network management system 300 may be configured to receive data about the optical signal transmission path from a device such as another computing device or a network element, for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 3, routing module 310 may be responsible for propagating link connectivity information to various nodes within an optical network, such as optical transport network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304.

In FIG. 3, signaling module 306 may provide functionality associated with setting up, modifying, and tearing down end-to-end networks services in an optical network, such as optical transport network 101. For example, when an ingress node in the optical network receives a service request, network management system 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of network management system 300, after an optical path has been provisioned, network management system 300 may configure a multi-carrier channel with unequal subcarrier spacing to mitigate the effects on FWM and increase reach of the multi-carrier channel. For example, network management system 300 may communicate with transmitter 102 and receiver 112 to enable unequal subcarrier spacing, as disclosed herein. Furthermore, network management system 300 may choose to apply unequal subcarrier spacing when the subcarriers are multi-carrier subcarriers, such as upon initial configuration of the optical path. Also, network management system 300 may monitor a bit error rate (BER) as a quality metric of a received single carrier or multi-carrier channel, for example, by receiving the BER from receiver 112. When the BER exceeds a predetermined value, network management system 300 may increase the transmission reach by using multi-carrier subcarriers with unequal subcarrier spacing, such as by sending appropriate commands to transmitter 102 and receiver 112 to reconfigure transmission over the optical path.

Figure 4A:
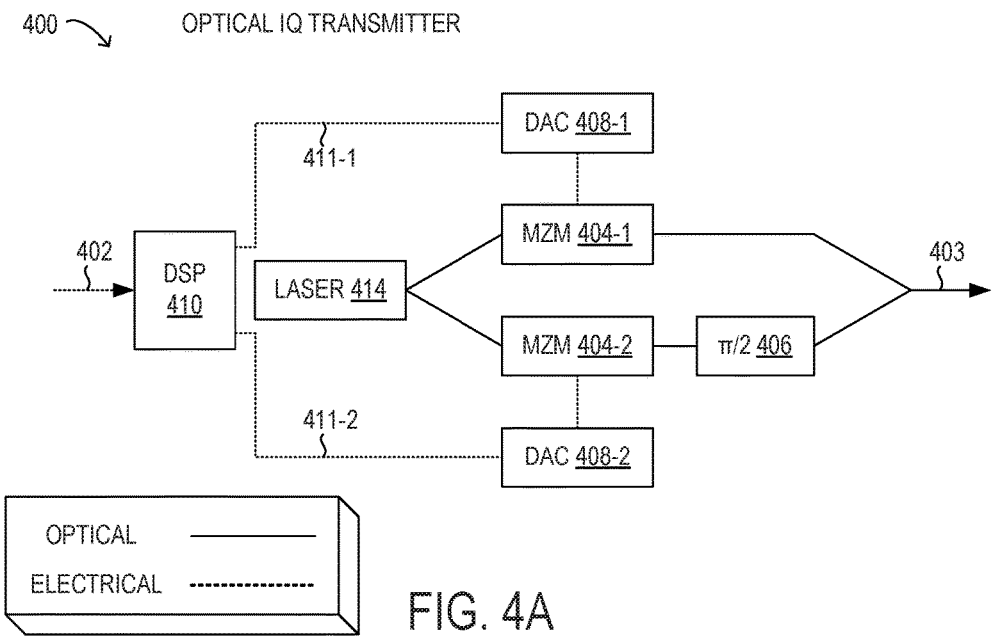
FIG. 4A is a block diagram of selected elements of an embodiment of an optical IQ transmitter.

Referring now to FIG. 4A, a block diagram of selected elements of an embodiment of an optical IQ transmitter 400 is shown. Transmitter 400 may be an embodiment of transmitter 102 in FIG. 1. Transmitter 400 is a schematic representation and is not drawn to scale. In various embodiments, transmitter 400 may be implemented with fewer or more elements than depicted. Dashed lines in FIG. 4A represent electrical signals, including digital data logically represented by electrical signals, while solid lines represent optical signals.

As shown, transmitter 400 may receive data 402 as an input signal for transmission at digital signal processor (DSP) 410, which may include (or have access to) a memory storing instructions executable by DSP 410. DSP 410 may generate real (I) portion 411-1 and imaginary (Q) portion 411-2 of the data 402 for optical modulation that are converted to analog signals by digital to analog converters (DAC). As shown, transmitter 400 includes Mach-Zehnder modulators (MZM) 404 that perform amplitude modulation using laser 414 as an optical source. Specifically, real (I) portion 411-1 is converted from digital data to an analog modulation signal by DAC 408-1 that is fed to MZM 404-1. At the same time, imaginary (Q) portion 411-2 is converted from digital data to an analog modulation signal by DAC 408-2 that is fed to MZM 404-2. After applying π/2 phase shift 406 to the output of MZM 404-2, the optical signals are combined to generate optical signal 403.

Figure 4B:
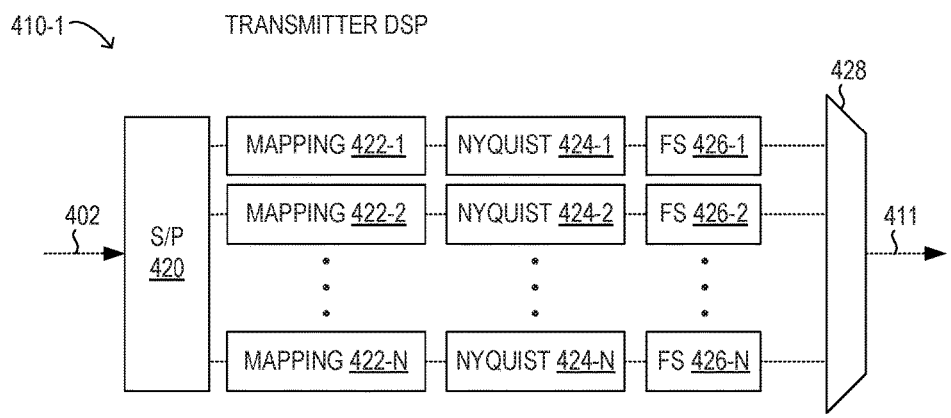
FIG. 4B is a block diagram of selected elements of an embodiment of a transmitter DSP.

In FIG. 4B, further details of an embodiment of DSP 410-1 are shown. DSP 410-1 may receive data 402 and then may perform serial-to-parallel conversion (S/P) 420 on data 402, such that each subcarrier portion of data 402, from 1 to N subcarriers, is subsequently processed in parallel. It is noted that in some embodiments, DSP 410-1 may include a field-programmable gate array (FPGA) for performing at least some of the functionality described herein. For each subcarrier 1 to N, DSP 410-1 may then perform symbol mapping 422 and Nyquist filtering 424 before frequency shifting (FS) 426 is applied. FS 426 may be enabled to adjust the subcarrier spacing within the multi-carrier channel, for example, to enable unequal subcarrier spectral spacing, as disclosed herein. Then, at subcarrier multiplexer 428, the individual subcarrier data are combined into signal portion 411, which may be either real (I) portion 411-1 or imaginary (Q) portion 411-2.

Figure 5A:
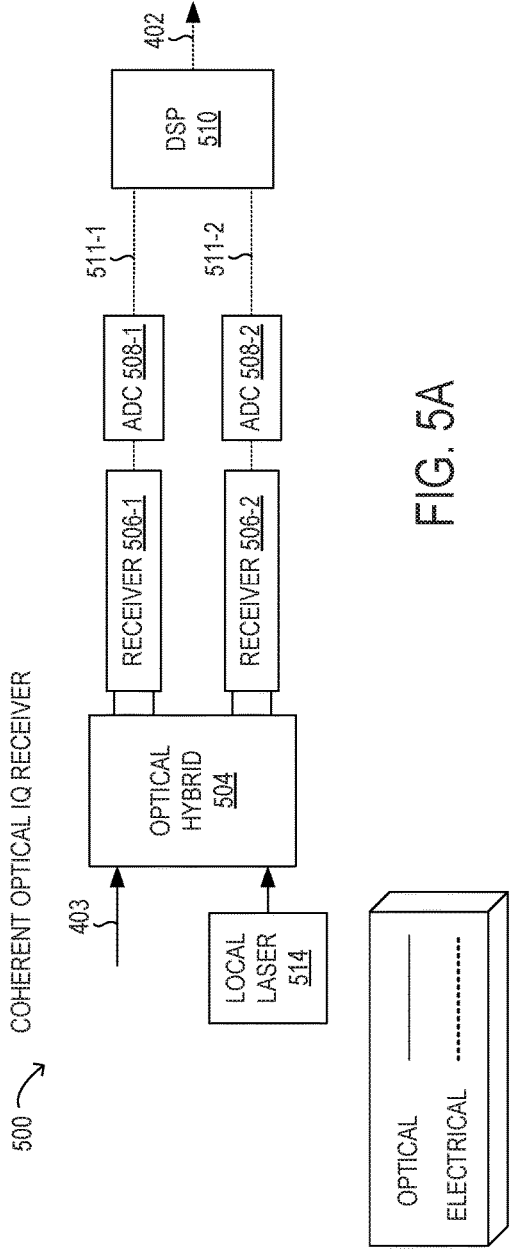
FIG. 5A is a block diagram of selected elements of an embodiment of an optical IQ receiver.

Referring now to FIG. 5A, a block diagram of selected elements of an embodiment of an optical IQ receiver 500 is shown. Receiver 500 may be an embodiment of receiver 112 in FIG. 1. Receiver 500 is a schematic representation and is not drawn to scale. In various embodiments, receiver 500 may be implemented with fewer or more elements than depicted. Dashed lines in FIG. 5A represent electrical signals, including digital data logically represented by electrical signals, while solid lines represent optical signals.

As shown in FIG. 5A, receiver 500 may receive optical signal 403 as input, for example, after transmission in an optical network. Optical signal 403 along with a local laser 514 may be received at optical hybrid 504. Optical hybrid 504 may be a 90° optical hybrid that mixes optical signal 403 into four quadrature states with local laser 514 used as a reference signal. The respective outputs of optical hybrid 504 may be fed as a real component to receiver 506-1 and as an imaginary component to receiver 506-2. Receivers 506 may be balanced receivers that perform coherent signal demodulation and also may perform optical power monitoring. After digitization by ADCs 508-1 and 508-2 respectively, DSP 510 receives real signal portion 511-1 and imaginary signal portion 511-2 of optical signal 403. DSP 510 may be used to extract the amplitude and phase information for each subcarrier to regenerate data 402. After data 402 is generated, a BER may be calculated.

Figure 5B:
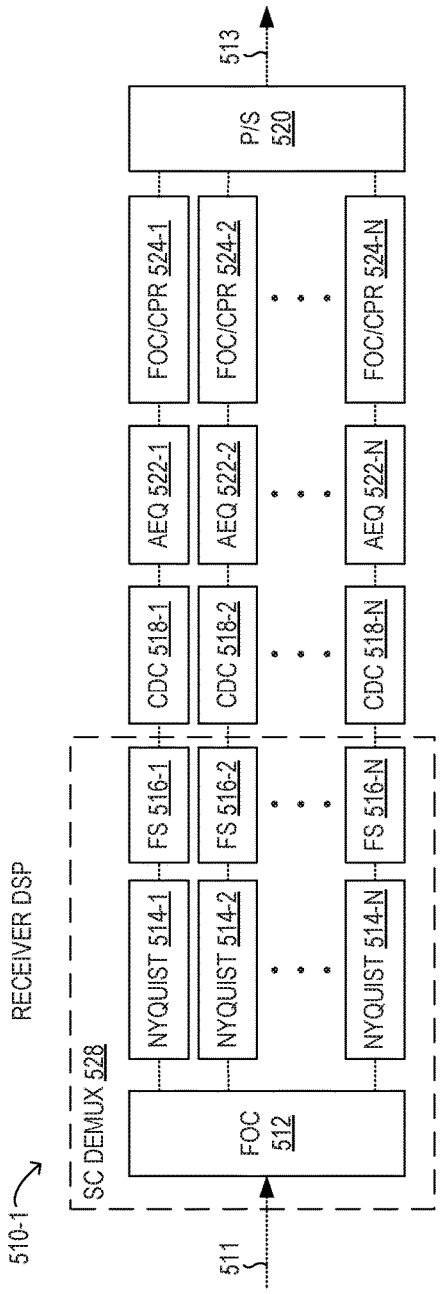
FIG. 5B is a block diagram of selected elements of an embodiment of a receiver DSP.

In FIG. 5B, further details of an embodiment of DSP 510-1 are shown. DSP 510-1 may receive signal portion 511 and then may perform frequency offset compensation 512 on signal portion 511, such that each subcarrier portion of signal portion 511, from 1 to N subcarriers, is subsequently processed in parallel. It is noted that in some embodiments, DSP 510-1 may include a field-programmable gate array (FPGA) for performing at least some of the functionality described herein. For each subcarrier 1 to N, DSP 510-1 may then perform Nyquist filtering 514 before frequency shifting (FS) 516 is applied. FOC 512, Nyquist filtering 514 and FS 516 may represent a subcarrier demultiplexer 528. FS 516 may be enabled to recognize the subcarrier spacing within the multi-carrier channel, for example, to enable receiving unequal subcarrier spectral spacing, as disclosed herein. Then, for each subcarrier 1 to N, chromatic dispersion compensation (CDC) 518 may be performed, followed by a constant modulus algorithm (CMA)-based adaptive equalization (AEQ) 522, and followed by FOC/carrier phase recovery (CPR) 524. Then, at parallel-to-serial converter 520, the signal portion 513, corresponding to one of the real or imaginary portion, is generated. Within DSP 510, the real and imaginary signal portions 513 may then be combined to generate data 402.

Figure 6:
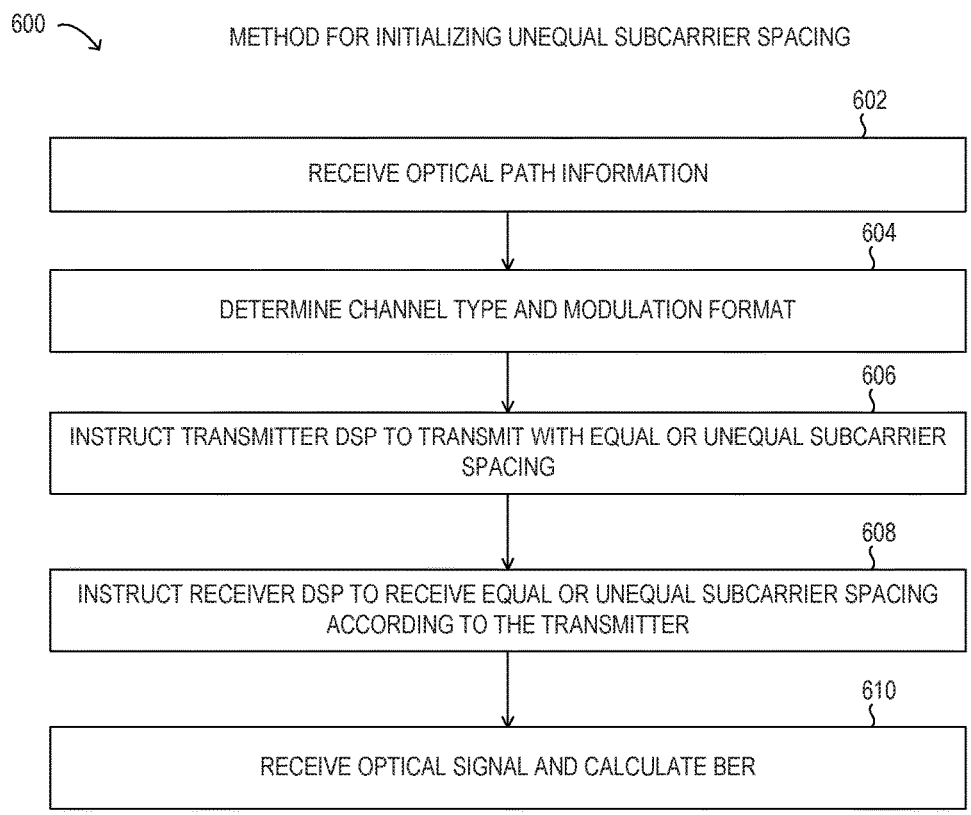
FIG. 6 is a flow chart of selected elements of a method for initializing unequal subcarrier spacing.

Referring now to FIG. 6, a flowchart of selected elements of an embodiment of method 600 for initializing unequal subcarrier spacing, as described herein, is depicted. Method 600 may be performed using optical transport network 101 by network management system 300, which may communicate with various components in optical transport network 101, as described above. It is noted that certain operations described in method 600 may be optional or may be rearranged in different embodiments.

Method 600 may begin at step 602 by receiving optical path information. At step 604, channel type and modulation format may be determined. At step 606, a transmitter DSP may be instructed to transmit with equal or unequal subcarrier spacing. At step 608, a receiver DSP may be instructed to receive equal or unequal subcarrier spacing according to the transmitter. At step 610, the optical signal is received and BER is calculated. It is noted that method 600 may be performed with multi-carrier type subcarriers.

Figure 7:
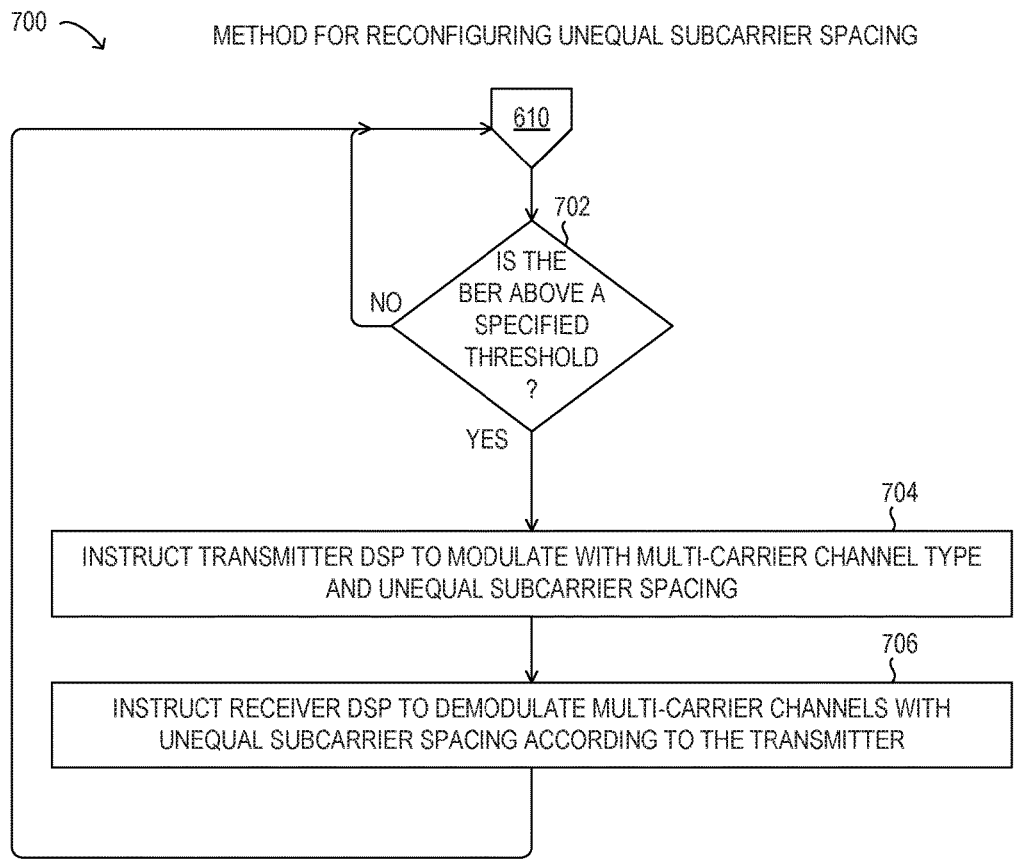
FIG. 7 is a flow chart of selected elements of a method for reconfiguring unequal subcarrier spacing.

Referring now to FIG. 7, a flowchart of selected elements of an embodiment of method 700 for reconfiguring unequal subcarrier spacing, as described herein, is depicted. Method 700 may be performed using optical transport network 101 by network management system 300, which may communicate with various components in optical transport network 101, as described above. It is noted that certain operations described in method 700 may be optional or may be rearranged in different embodiments.

Method 700 may begin after step 610 in method 600. At step 702, a decision is made whether the BER is above a specified threshold. When the result of step 702 is NO, the BER is not above the specified threshold, method 700 may loop back to step 610. When the result of step 702 is YES, the BER is above the specified threshold, method 700 may, at step 704, instruct the transmitter DSP to modulate with a multi-carrier channel type and unequal subcarrier spacing. At step 706, the receiver DSP is instructed to demodulate multi-carrier channels with unequal subcarrier spacing according to the transmitter.

As disclosed herein, methods and systems for reach extension of multi-carrier channels using unequal subcarrier spacing may decrease FWM by grouping the subcarriers into groups of 2 subcarriers, and apply a secondary, unequal spacing between the groups. In this manner, nonlinear interactions may be reduced and the transmission reach of a multi-carrier channel may be extended.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. An optical transmitter, comprising:
   a digital signal processor (DSP); and
   a memory media accessible to the DSP, wherein the memory media stores instructions executable by the DSP for:
   receiving data for optical transmission as a multi-carrier channel having a plurality of subcarriers;
   mapping the data onto the plurality subcarriers;
   responsive to receiving a command to apply unequal spectral spacing between at least some of the subcarriers, applying a second spectral spacing between pairs of subcarriers that are tightly packed to each other at a first spectral spacing corresponding to a bandwidth of the subcarriers, wherein the second spectral spacing is greater than the first spectral spacing; and
   generating at least one output signal usable to modulate a laser to carry the data as the multi-carrier channel having unequal spectral spacing between at least some of the subcarriers, wherein
   the first spectral spacing is given by $\Delta fsc$, the second spectral spacing is given by $\Delta f2$, and wherein a relationship between $\Delta fsc$ and $\Delta f2$ is given by:

$$\Delta fsc/2 \leq (\Delta f2 - \Delta fsc) < \Delta fsc.$$

2. The optical transmitter of claim 1, wherein the command is received from a network management system.

3. The optical transmitter of claim 1, wherein the command is received based on a bit error rate (BER) exceeding a predetermined threshold for the multi-carrier channel received at an optical receiver.

4. The optical transmitter of claim 1,
   wherein the command is based on a modulation format for the multi-carrier channel.

5. The optical transmitter of claim 1, wherein a guardband (GB) between spectrally successive multi-carrier channels is given by:
   $\Delta fsc*M < GB \leq \Delta f2*L$, wherein M and L are integers greater than 1.

6. An optical receiver, comprising:
   a digital signal processor (DSP); and
   a memory media accessible to the DSP, wherein the memory media stores instructions executable by the DSP for:
   receiving demodulated data optically transmitted as a multi-carrier channel having a plurality of subcarriers;
   responsive to receiving a command indicating unequal spectral spacing between at least some of the subcarriers including a second spectral spacing between pairs of subcarriers that are tightly packed to each other at a first spectral spacing corresponding to a bandwidth of the subcarriers, wherein the second spectral spacing is greater than the first spectral spacing, spectrally resolving the subcarriers based on the unequal spectral spacing; and
   generating at least one output signal usable to generate the data, wherein
   the first spectral spacing is given by $\Delta fsc$, the second spectral spacing is given by $\Delta f2$, and wherein a relationship between $\Delta fsc$ and $\Delta f2$ is given by:

$$\Delta fsc/2 < (\Delta f2 - \Delta fsc) < \Delta fsc.$$

7. The optical receiver of claim 6, wherein the command is received from a network management system.

8. The optical receiver of claim 6, wherein the command is received based on a bit error rate (BER) exceeding a predetermined threshold for the multi-carrier channel, wherein the BER is determined at the optical receiver.

9. The optical receiver of claim 6, wherein the demodulated data are received from an optical hybrid receiver included in the optical receiver.

10. The optical receiver of claim 6, wherein a guardband (GB) between spectrally successive multi-carrier channels is given by:
    $\Delta fsc*M < GB \leq \Delta f2*L$, wherein M and L are integers greater than 1.

11. A network management system comprising:
    a processor; and a memory media accessible to the processor, the memory media storing instructions executable by the processor for:
  receiving optical path information for an optical path in an optical network;
  receiving channel information specifying a multi-carrier channel having a plurality of subcarriers for transmission over the optical path;
  sending a first command to an optical transmitter transmitting the multi-carrier channel to transmit using unequal spectral spacing for at least some of the subcarriers in the multi-carrier channel by applying a second spectral spacing between pairs of subcarriers that are tightly packed to each other at a first spectral spacing corresponding to a bandwidth of the subcarriers, wherein the second spectral spacing is greater than the first spectral spacing;
  sending a second command to an optical receiver receiving the multi-carrier channel to receive according to the unequal spectral spacing; and
  receiving a bit error rate (BER) from the optical receiver for the multi-carrier channel, wherein
  the first spectral spacing is given by $\Delta fsc$, the second spectral spacing is given by $\Delta f2$, and wherein a relationship between $\Delta fsc$ and $\Delta f2$ is given by:

$$\Delta fsc/2 \leq (\Delta f2 - \Delta fsc) < \Delta fsc.$$

12. The network management system of claim 11, wherein the channel information comprises:
  a number of subcarriers in the multi-carrier channel; and
  a modulation format for the subcarriers.

13. The network management system of claim 11, wherein the first command and the second command are sent based on the BER exceeding a specified value.

14. The network management system of claim 11, wherein a guardband (GB) between spectrally successive multi-carrier channels is given by:
  $\Delta fsc*M < GB \leq \Delta f2*L$, wherein M and L are integers greater than 1.

* * * * *